United States Patent
Santoso et al.

(10) Patent No.: US 11,966,686 B2
(45) Date of Patent: Apr. 23, 2024

(54) SYNTHETIC INTELLIGENT EXTRACTION OF RELEVANT SOLUTIONS FOR LIFECYCLE MANAGEMENT OF COMPLEX SYSTEMS

(71) Applicant: THE BOEING COMPANY, Chicago, IL (US)

(72) Inventors: Robert Santoso, Anaheim, CA (US); Keith Pete Cai, Ontario, CA (US); Jay J. Patel, Irvine, CA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 16/443,077

(22) Filed: Jun. 17, 2019

(65) Prior Publication Data

US 2020/0394257 A1 Dec. 17, 2020

(51) Int. Cl.
*G06F 16/00* (2019.01)
*G06F 16/9032* (2019.01)
*G06F 16/9035* (2019.01)
*G06F 16/93* (2019.01)
*G06F 40/157* (2020.01)
*G06F 16/30* (2019.01)

(52) U.S. Cl.
CPC ...... *G06F 40/157* (2020.01); *G06F 16/90328* (2019.01); *G06F 16/9035* (2019.01); *G06F 16/93* (2019.01)

(58) Field of Classification Search
None
See application file for complete search history.

(56) References Cited

U.S. PATENT DOCUMENTS 5,907,841 A * 5/1999 Sumita ................ G06F 16/3344
6,675,159 B1 1/2004 Lin et al.
(Continued)

FOREIGN PATENT DOCUMENTS

EP 3543867 A1 9/2019

OTHER PUBLICATIONS

Wong, Wilson, Wei Liu, and Mohammed Bennamoun, "Ontology learning from text: A look back and into the future" 2012, ACM computing surveys (CSUR) 44.4, pp. 1-36. (Year: 2012).*

(Continued)

*Primary Examiner* — Polina G Peach
(74) *Attorney, Agent, or Firm* — Patterson + Sheridan, LLP

(57) ABSTRACT

The present disclosure provides for predictive query processing for complex system lifecycle management by identifying a seed document including natural language text describing an issue with a complex system; creating a synthesized document for the seed document by: removing portions of the seed document determined to satisfy filtering rules; identifying a first term set included in the natural language text that map to terminology identified in a data dictionary; extracting term-order data based on locations of the first term set in the natural language text; and including the first term set and the term-order data in the synthesized document; identifying, from a corpus of historic electronic documents, a first document set that are related to the seed document based on the term-order data included in the synthesized document; and outputting at least a portion of the first set of historic electronic documents.

20 Claims, 10 Drawing Sheets

(56) References Cited

U.S. PATENT DOCUMENTS

| | | | |
|---|---|---|---|
| 6,778,979 B2 | 8/2004 | Grefenstette et al. | |
| 7,194,483 B1* | 3/2007 | Mohan | G06F 16/30 |
| | | | 707/600 |
| 7,492,235 B2 | 2/2009 | Vice | |
| 7,493,325 B1 | 2/2009 | Bhatnagar et al. | |
| 8,380,489 B1* | 2/2013 | Zhang | G06F 40/30 |
| | | | 704/4 |
| 9,037,580 B2 | 5/2015 | Brown et al. | |
| 9,256,649 B2* | 2/2016 | Patton | G06F 16/24578 |
| 9,449,080 B1* | 9/2016 | Zhang | G06F 16/3346 |
| 9,606,990 B2 | 3/2017 | Allen et al. | |
| 9,852,213 B2 | 12/2017 | Brown et al. | |
| 9,940,323 B2 | 4/2018 | Boyer et al. | |
| 10,474,700 B2* | 11/2019 | Sennhauser | G06F 16/35 |
| 11,244,115 B2* | 2/2022 | Xu | G06F 40/30 |
| 2003/0069877 A1 | 4/2003 | Grefenstette et al. | |
| 2003/0154071 A1* | 8/2003 | Shreve | G06F 40/58 |
| | | | 704/9 |
| 2004/0068497 A1 | 4/2004 | Rishel et al. | |
| 2005/0080613 A1* | 4/2005 | Colledge | G06F 16/951 |
| | | | 704/9 |
| 2005/0097628 A1* | 5/2005 | Lussier | A61P 21/00 |
| | | | 800/260 |
| 2007/0094594 A1* | 4/2007 | Matichuk | G06F 40/253 |
| | | | 715/255 |
| 2010/0082333 A1* | 4/2010 | Al-Shammari | G06F 16/3335 |
| | | | 704/10 |
| 2010/0145720 A1* | 6/2010 | Reiner | G16H 50/20 |
| | | | 705/2 |
| 2010/0145961 A1* | 6/2010 | Hu | G06F 16/355 |
| | | | 707/758 |
| 2011/0035211 A1* | 2/2011 | Eden | G06F 16/313 |
| | | | 704/10 |
| 2011/0202334 A1* | 8/2011 | Abir | G06F 40/55 |
| | | | 704/4 |
| 2012/0197862 A1* | 8/2012 | Woytowitz | G06F 16/36 |
| | | | 707/710 |
| 2013/0035961 A1* | 2/2013 | Yegnanarayanan | G06F 19/00 |
| | | | 705/3 |
| 2013/0046723 A1* | 2/2013 | Sweeney | G06F 16/951 |
| | | | 706/47 |
| 2013/0061200 A1* | 3/2013 | Roberts | G06F 40/157 |
| | | | 717/100 |
| 2014/0058722 A1* | 2/2014 | Sun | G06F 40/284 |
| | | | 704/9 |
| 2014/0108924 A1* | 4/2014 | Bhatt | G06F 40/166 |
| | | | 715/271 |
| 2014/0136972 A1 | 5/2014 | Rodgers et al. | |
| 2014/0278361 A1* | 9/2014 | Pak | G06F 40/232 |
| | | | 704/9 |
| 2014/0280087 A1* | 9/2014 | Isensee | G06F 16/3329 |
| | | | 707/723 |
| 2015/0193413 A1* | 7/2015 | Meschkat | G06F 40/232 |
| | | | 715/230 |
| 2016/0092436 A1* | 3/2016 | Obayashi | G06F 40/263 |
| | | | 358/1.11 |
| 2016/0373423 A1* | 12/2016 | Naibo | G06F 40/284 |
| 2017/0011026 A1 | 1/2017 | Byron et al. | |
| 2017/0039176 A1* | 2/2017 | Broderick | G06F 40/186 |
| 2017/0039188 A1 | 2/2017 | Allen et al. | |
| 2017/0091289 A1* | 3/2017 | Ohazulike | G06Q 10/20 |
| 2017/0193092 A1* | 7/2017 | Byron | G06F 40/279 |
| 2017/0262528 A1* | 9/2017 | Potok | G06F 16/3338 |
| 2017/0364507 A1 | 12/2017 | Byron et al. | |
| 2018/0039620 A1* | 2/2018 | Ciulla | G06F 40/289 |
| 2018/0081861 A1* | 3/2018 | Danielyan | G06F 40/169 |
| 2018/0121539 A1* | 5/2018 | Ciulla | G06F 16/3344 |
| 2018/0137419 A1* | 5/2018 | Byron | G06N 5/022 |
| 2018/0225373 A1 | 8/2018 | Alba et al. | |
| 2018/0225374 A1 | 8/2018 | Alba et al. | |
| 2018/0246876 A1* | 8/2018 | Allen | G06F 40/247 |
| 2019/0130028 A1* | 5/2019 | Rajpathak | G06F 16/353 |
| 2019/0205322 A1* | 7/2019 | Dobrynin | G06F 16/355 |
| 2019/0205384 A1* | 7/2019 | Zhu | G06F 16/3344 |
| 2019/0294726 A1 | 9/2019 | Santoso et al. | |
| 2019/0303496 A1* | 10/2019 | Weinstein | G06F 16/358 |
| 2020/0026722 A1* | 1/2020 | Eade | G06T 7/33 |

OTHER PUBLICATIONS

Extended European Search Report for Application No. 19163645.5-1217 dated Aug. 8, 2019.

Patrice Lopez et al: "Patatras: Retrieval Model Combination and Regression Models for Prior Art Search", Sep. 30, 2009 (Sep. 30, 2009), Multilingual Information Access Evaluation I. Text Retrieval Experiments, Springer Berlin Heidelberg, Berlin, Heidelberg, pp. 430-437.

European Patent Office, Summons to attend oral proceedings pursuant to Rule 115(1) EPC for Application 19 163 645.5-1203 dated May 24, 2022.

European Patent Office Examination Report for Application No. 19 163 645.5-1213 dated Mar. 17, 2021.

* cited by examiner

400

SUBJECT: LEFT CAR DOOR TRIM P/N XXXX1234 REFINISHING

~~The~~ manual indicates ~~that~~ we must replace ~~the~~ door trim P/N XXXX1234 ~~on the~~ LH driver's door during our repair ~~of the~~ vehicle. ~~(shown in view /A/ and /B).~~ ~~The~~ online parts catalog (Ref /C/) suggests ~~to~~ request ~~the~~ P/N XXXX2345 ~~as a~~ replacement part instead of P/N XXXX1234. ~~However,~~ P/N XXXX2345 is not in stock ~~and the~~ recorded lead time for P/N XXXX2345 is 338 calendar days. ~~Our~~ customer ~~will~~ require ~~his~~ vehicle well in advance ~~of that~~ date, ....

We propose ~~to~~ manufacture ~~a~~ temporary replacement part until P/N XXXX2345 is available. Ref /D/ and /E/ indicate ~~that~~ P/N XXXX2345 ~~needs a~~ finish treatment ~~that we~~ do not have ~~the~~ resources ~~to~~ provide. ~~We~~ request ~~for your~~ allowance ~~to~~ perform ~~an~~ alternate plating process ~~as~~ defined by Ref /F/, ~~as an~~ alternative finish treatment. Please evaluate ~~our~~ proposal.

Synonym and Stem Words Applied:

LH → Left Hand
Finishing → Finish
Replacement → Replace

SUBJECT: LEFT CAR DOOR TRIM P/N XXXX1234 REFINISHING

The manual indicates that we must replace the door trim P/N XXXX1234 on the LH driver's
door during our repair of the vehicle. (shown in view /A/ and /B/). The online parts catalog
(Ref /C/) suggests to request the P/N XXXX2345 as a replacement part instead of P/N
XXXX1234. However, P/N XXXX2345 is not in stock and the recorded lead time for
P/N XXXX2345 is 338 calendar days. Our customer will require his vehicle well in
advance of that date, ....

We propose to manufacture a temporary replacement part until P/N XXXX2345 is available.
Ref /D/ and /E/ indicate that P/N XXXX2345 needs a finish treatment that we do not have the
resources to provide. We request for your allowance to perform an alternate plating process
as defined by Ref /F/, as an alternative finish treatment. Please evaluate our proposal.

SUBJECT: LEFT CAR DOOR TRIM P/N XXXX1234 REFINISHING

The manual indicates that we must replace the door trim P/N XXXX1234 on the LH driver's door during our repair of the vehicle. (shown in view /A/ and /B/). The online parts catalog (Ref /C/) suggests to request the P/N XXXX2345 as a replacement part instead of P/N XXXX1234. However, P/N XXXX2345 is not in stock and the recorded lead time for P/N XXXX2345 is 338 calendar days. Our customer will require his vehicle well in advance of that date, ....

We propose to manufacture a temporary replacement part until P/N XXXX2345 is available. Ref /D/ and /E/ indicate that P/N XXXX2345 needs a finish treatment that we do not have the resources to provide. We request for your allowance to perform an alternate plating process as defined by Ref /F/, as an alternative finish treatment. Please evaluate our proposal.

SUBJECT: LEFT CAR DOOR TRIM P/N XXXX1234 REFINISHING

The manual indicates that we must replace the door trim P/N XXXX1234 on the LH driver's door during our repair of the vehicle. (shown in view /A/ and /B/). The online parts catalog (Ref /C/) suggests to request the P/N XXXX2345 as a replacement part instead of P/N XXXX1234. However, P/N XXXX2345 is not in stock and the recorded lead time for P/N XXXX2345 is 338 calendar days. Our customer will require his vehicle well in advance of that date, ....

We propose to manufacture a temporary replacement part until P/N XXXX2345 is available. Ref /D/ and /E/ indicate that P/N XXXX2345 needs a finish treatment that we do not have the resources to provide. We request for your allowance to perform an alternate plating process as defined by Ref /F/, as an alternative finish treatment. Please evaluate our proposal.

SUBJECT: *LEFT CAR* DOOR TRIM P/N XXX1234 REFINISHING

The manual indicates that we must replace the *door* trim P/N XXXX1234 on the *LH driver's door* during our repair of the vehicle. (shown in view /A/ and /B/). The online parts catalog (Ref /C/) suggests to request the P/N XXXX2345 as a replacement part instead of P/N XXXX1234. However, P/N XXXX2345 is not in stock and the recorded lead time for P/N XXXX2345 is 338 calendar days. Our customer will require his vehicle well in advance of that date, ...

We propose to manufacture a temporary replacement part until P/N XXXX2345 is available. Ref /D/ and /E/ indicate that P/N XXXX2345 needs a finish treatment that we do not have the resources to provide. We request for your allowance to perform an alternate plating process as defined by Ref /F/, as an alternative finish treatment. Please evaluate our proposal.

FIG. 4E

| BMN | SR# | SERIES/PRODUCTS | PART # | Description |
|---|---|---|---|---|
| ABC-XYZ-12-1234 | 1-1234567 | ABC-20 | | Hood surface finish |
| ABC-XYZ-12-2345 | 1-2345678 | XYZ-801 | | PASSENGER DOOR FINISH |
| ABC-XYZ-12-3456 | 1-3456789 | ABC-20 | | FABRICATION WITH ALTERNATE FINISHING OF XYZ123 BRACKET |
| ABC-XYZ-12-4567 | 1-4567890 | ABC-50 | | Finishing requirements for replacement part |
| ABC-XYZ-12-5678 | 1-5678901 | XYZ-801 | | ABC-12345: FABRICATION WITH ALTERNATE FINISHING OF XYZ321 BOLT |
| ABC-XYZ-12-6789 | 1-6789012 | XYZ-801 | | REPAIRING DAMAGE TO LEATHER SEAT |
| ABC-XYZ-12-7890 | 1-7890123 | ABC-50 | XXXX1234 | Finish Substitution for Classic Car |
| ABC-XYZ-12-8901 | 1-8901234 | ABC-20 | | FABRICATION AND ALTERNATE FINISHING OF ABC7890 PLATE |
| ABC-XYZ-12-9012 | 1-9012345 | ABC-50 | | Lower Doorframe Finish Color |
| ABC-XYZ-12-0123 | 1-0123456 | XYZ-801 | XXXX1234 | Interior Material Substitution |

SYNTHETIC INTELLIGENT EXTRACTION OF RELEVANT SOLUTIONS FOR LIFECYCLE MANAGEMENT OF COMPLEX SYSTEMS

FIELD

The present disclosure relates to electronic document retrieval, and more specifically, to techniques for determining a set of historical natural language documents that are relevant to a received natural language document describing an issue with a complex system.

BACKGROUND

Complex systems, such as commercial aircraft, occasionally experience equipment issues, faults, or discrepancies (collectively referred to herein as issues). Some commercial aircraft and other complex systems can transmit issue data to one or more computer systems, such as computer systems used by maintenance centers and computer systems operated by the aircraft manufacturer. In many instances, issues with a complex system are documented in natural language data, e.g., written by an engineer that is working to address the issue.

SUMMARY

The present disclosure provides a method for predictive query processing for complex system lifecycle management in one aspect, the method including: identifying a seed electronic document including natural language text describing an issue with a complex system; creating a synthesized document for the seed electronic document by: removing a portion of the seed electronic document that is determined to satisfy a predefined filtering rule; identifying a first set of terms included in the natural language text that map to terminology identified in a data dictionary; extracting term-order data based on locations of the first set of terms in the natural language text; and including the first set of terms and the term-order data in the synthesized document; identifying, from a corpus of historic electronic documents, a first set of historic electronic documents that are related to the seed electronic document based on the term-order data included in the synthesized document; and returning at least a portion of the first set of historic electronic documents.

In one aspect, in combination with any example method above or below, synthesizing the seed electronic document further comprises categorizing terms included in the first set of terms; and extracting the term-order data includes determining relationships between the terms based on categories assigned to the terms and a relative order of the terms in the natural language text.

In one aspect, in combination with any example method above or below, the terms are categorized into one or more of the categories, and wherein the categories include: locational terms; temporal terms; part identity terms; standard identity terms; issue subject terms; solution identity terms; action predicate terms; and modifier terms.

In one aspect, in combination with any example method above or below, the method further includes: in response to receiving user selection of a given historic electronic document of the first set of historic electronic documents, updating a machine learning model used to extract the term-order data based on the user selection.

In one aspect, in combination with any example method above or below, the method further includes: analyzing the historic electronic documents; identifying an additional term included in the historic electronic documents at a predefined frequency of use; and adding the additional term to the terminology stored in the data dictionary.

In one aspect, in combination with any example method above or below, the method further includes: identifying a second set of terms included in the natural language text that map to a predefined format matching rule; and including the second set of terms in the synthesized document, wherein extracting the term-order data is further based on locations of the second set of terms in the natural language text.

In one aspect, in combination with any example method above or below, the predefined format matching rule identifies one of a part number or a standard.

In one aspect, in combination with any example method above or below, the method further includes: ranking the first set of historic electronic documents for display on the requesting device based on a relevancy score assigned according to the term-order data.

In one aspect, in combination with any example method above or below, the method further includes: ranking a second set of historic electronic documents for display on the requesting device in combination with the first set of historic electronic documents based on a relevancy score assigned according to the term-order data.

In one aspect, in combination with any example method above or below, identifying the first set of historic electronic documents that are related to the seed electronic document further comprises: clustering the historic electronic documents based on historic term-order data associated with the historic electronic documents; determining which clusters of the historic electronic documents the seed electronic document belongs to based on the term-order data; and categorizing the historic electronic documents that belong to the clusters that the seed electronic document is determined to belong to as match electronic documents to the seed electronic document, wherein match electronic documents are determined to be related to the seed electronic document.

The present disclosure provides a system for predictive query processing for complex system lifecycle management in one aspect, the system including: a processor; and a memory storage device, including instructions that when performed by the processor perform an operation comprising: identifying a seed electronic document including natural language text describing an issue with a complex system; creating a synthesized document for the seed electronic document by: removing a portion of the seed electronic document that is determined to satisfy a predefined filtering rule; identifying a first set of terms included in the natural language text that map to terminology identified in a data dictionary; extracting term-order data based on locations of the first set of terms in the natural language text; and including the first set of terms and the term-order data in the synthesized document; identifying, from a corpus of historic electronic documents, a first set of historic electronic documents that are related to the seed electronic document based on the term-order data included in the synthesized document; and returning at least a portion of the first set of historic electronic documents.

In one aspect, in combination with any example system above or below, the operation further comprises: categorizing terms included in the first set of terms; and wherein extracting the term-order data includes determining relationships between the terms based on categories assigned to the terms and a relative order of the terms in the natural language text.

In one aspect, in combination with any example system above or below, the operation further comprises: in response to receiving user selection of a given historic electronic document of the first set of historic electronic documents, updating a machine learning model used to extract the term-order data based on the user selection.

In one aspect, in combination with any example system above or below, the operation further comprises: ranking the first set of historic electronic documents for display on the requesting device based on a relevancy score assigned according to the term-order data.

In one aspect, in combination with any example system above or below, identifying the first set of historic electronic documents that are related to the synthesized document further comprises: clustering the historic electronic documents based on historic term-order data associated with the historic electronic documents; determining which clusters of the historic electronic documents the seed electronic document belongs to based on the term-order data; and categorizing the historic electronic documents that belong to the clusters that the seed electronic document is determined to belong to as match electronic documents to the seed electronic document, wherein match electronic documents are determined to be related to the seed electronic document.

The present disclosure provides a computer readable storage medium including instructions that when performed by a computer processor enable the computer processor to provide for predictive query processing for complex system lifecycle management in one aspect, the instructions enabling the processor to identify a seed electronic document including natural language text describing an issue with a complex system; create a synthesized document, for the seed electronic document wherein to create the synthesized document the instructions further enable the computer processor to: remove a portion of the seed electronic document that is determined to satisfy a predefined filtering rule; identify a first set of terms included in the natural language text that map to terminology identified in a data dictionary; extract term-order data based on locations of the first set of terms in the natural language text; and include the first set of terms and the term-order data in the synthesized document; identify, from a corpus of historic electronic documents, a first set of historic electronic documents that are related to the seed electronic document based on the term-order data included in the synthesized document; and return at least a portion of the first set of historic electronic documents.

In one aspect, in combination with any example computer readable storage medium above or below, the instructions, when performed, further enable to processor to: categorize terms included in the first set of terms; and wherein extracting the term-order data includes determining relationships between the terms based on categories assigned to the terms and a relative order of the terms in the natural language text.

In one aspect, in combination with any example computer readable storage medium above or below, the instructions, when performed, further enable to processor to: in response to receiving user selection of a given historic electronic document of the first set of historic electronic documents, update a machine learning model used to extract the term-order data based on the user selection.

In one aspect, in combination with any example computer readable storage medium above or below, the instructions, when performed, further enable to processor to: rank the first set of historic electronic documents for display on the requesting device based on a relevancy score assigned according to the term-order data.

In one aspect, in combination with any example computer readable storage medium above or below, wherein to identify the first set of historic electronic documents that are related to the seed electronic document, the instructions further enable the computer processor to: cluster the historic electronic documents based on historic term-order data associated with the historic electronic documents; determine which clusters of the historic electronic documents the seed electronic document belongs to based on the term-order data; and categorize the historic electronic documents that belong to the clusters that the seed electronic document is determined to belong to as match electronic documents to the seed electronic document, wherein match electronic documents are determined to be related to the seed electronic document.

In one aspect, in combination with any example computer readable storage medium above or below, the terms are categorized into one or more categories, and wherein the categories include: locational terms; temporal terms; part identity terms; standard identity terms; issue subject terms; solution identity terms; action predicate terms; and modifier terms.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

FIGS. 4A-4E illustrate terms identified within an electronic document through various term-identification techniques, according to aspects of the present disclosure.

FIG. 5 illustrates a graphical user interface representing exemplary query results, according to one aspect of the present disclosure.

DETAILED DESCRIPTION

Figure 1:
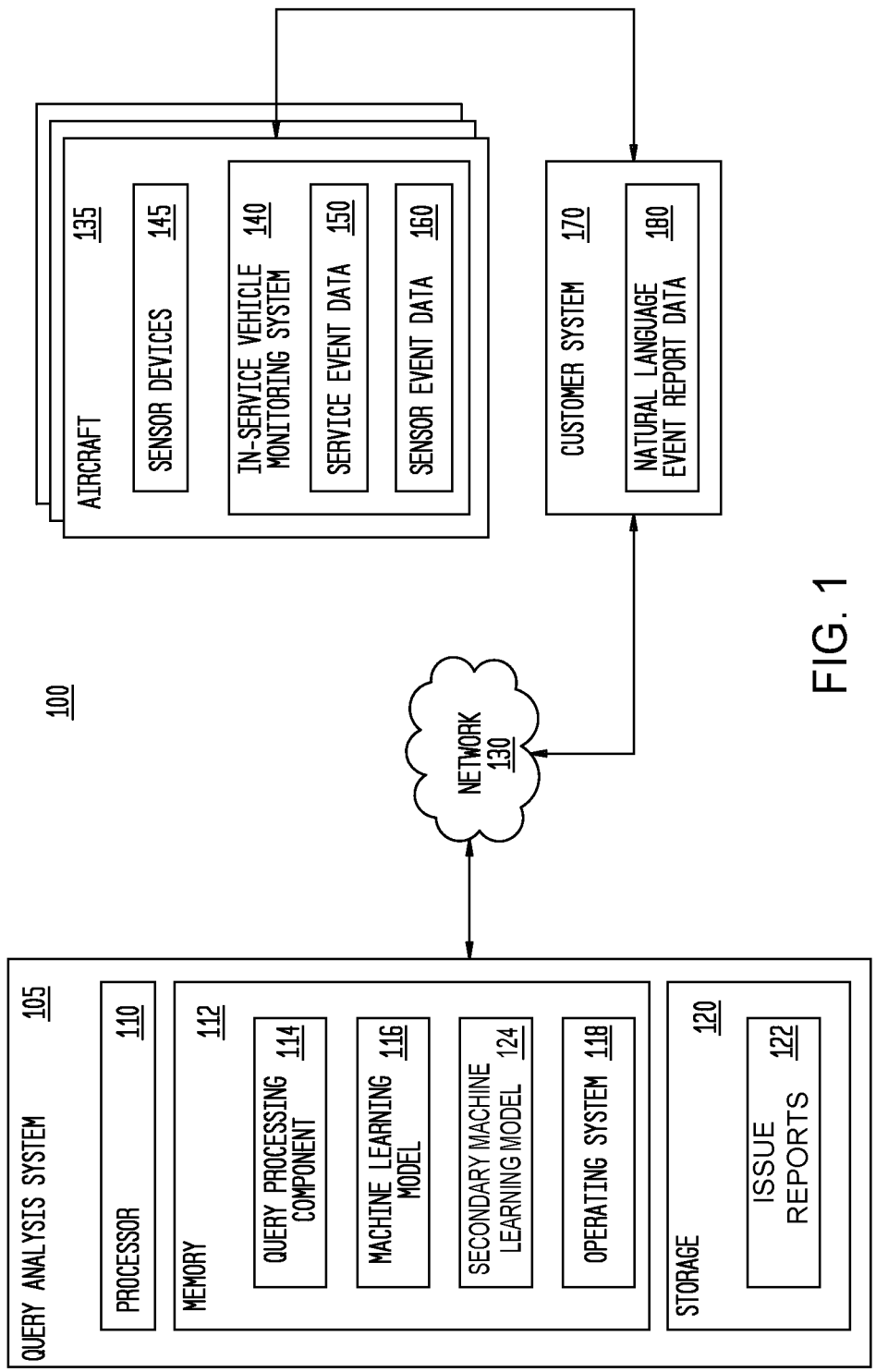
FIG. 1 is a block diagram of an example system that includes a query processing component, according to aspects of the present disclosure.

Modern manufacturers and service providers have an increasingly large set of data relating to the lifecycle of complex systems. For example, an aircraft manufacturer may collect various data regarding the complex system, including performance data from sensors on the aircraft, maintenance reports, maintenance solutions, service bulletins, and so on. Frequently, the solution to a given issue with a complex system can be found within the data repository maintained by the manufacturer, as in many cases the issue has been experienced previously with a similar complex system and details describing the solution to the issue are documented within the data repository. However, due to the size of the data repository and the difficulty in generating an effective search query for finding data relating to a specific issue with a specific complex system, conventional computer-based searching solutions are insufficient to address the needs of complex system manufacturers and service providers.

For example, an aircraft manufacturer may receive several sentences of natural language text describing the issue a customer is experiencing with a particular aircraft. While a search query could be generated using the entirety of the natural language text, doing so does not distinguish which piece(s) of data within the text are relevant and/or important to the specific issue the customer is experiencing. For example, stop words (e.g., a, an, the, etc.) are common to almost all natural language text and are generally unimportant for inclusion in search queries, while information such as part numbers, aircraft locations, the specific issue being experienced, and so on can be highly relevant.

Conventional technical solutions do not provide adequate ways to transform a natural language customer report for an aircraft maintenance event into a search query that will produce accurate results detailing the solution(s) to the issue the customer is experiencing. As a result, in many instances, the task of searching the data repository for the solution is a manual process, with an aircraft manufacturer or service provider employee generating a search query (or multiple search queries) and manually reviewing the query results in order to identify a potential solution for the customer. Such a process is expensive in terms of both time and resources. Moreover, the service provider employee performing the search may struggle to identify the relevant search terms within the natural language report of the issue, unless the service provider employee has a substantial understanding of the lifecycle of the aircraft and common issues and solutions faced during the lifecycle. It can be difficult and expensive to find employees with the proper knowledgebase and understanding to efficiently perform such searches, thereby rendering conventional solutions inefficient and hindering the scalability of such solutions.

Aspects described herein provide techniques to solve the technical challenge of automating the computer-based determination of relevant electronic documents within an electronic data repository, based on a natural language report of an issue with a complex system, in order to identify relevant solutions and other information described within electronic documents in the data repository. Advantageously, the techniques described herein can autonomously determine a set of electronic documents within the data repository that identify similar complex system issues and the corresponding applicable solutions, based on a given natural language report of an issue with a complex system, thereby significantly reducing the lifecycle cost of the complex system (e.g., an aircraft) and helping to reduce the use of maintenance personnel and engineers to manually intervene in the search process.

Generally, the aspects described herein provide method(s) for synthesizing metadata and entire documents to describe natural language text, which are used to identify relevant solution information to a user submitting an issue report 122 from a corpus of previously analyzed natural language text (e.g., previously submitted and analyzed issue reports 122). Aspects described herein can identify similar bodies of natural language text (e.g., a prior write-up identifying a solution). One aspect of the present disclosure produces a relevant searchable data model, which can be searched against the entirety of a submitted document, identify keywords found in the natural language text and return prior documents determined to be similar to the submitted document based on a similar semantic structure.

One aspect provides computer-based search functionality to identify similar, previously documented aircraft issues with applicable solutions, based on a natural language report of an aircraft issue for a particular aircraft. While aspects are described herein as relating to the maintenance and lifecycle of aircrafts, more generally the techniques described herein can be applied to the lifecycle of other products as well, and are not limited only to aircrafts. As such, the examples within the present disclosure pertaining to the maintenance and lifecycle of aircrafts are provided for illustrative purposes only and without limitation. More generally, however, aspects can be applied to the maintenance and lifecycle of a variety of different products (e.g., other vehicles, complex systems, etc.) to increase efficiencies, reduce cost, and increase product availability. Aspects described herein provide best fit solutions and refinement capability to increase accuracy to achieve high-level usability, by synthesizing customer information with a machine learning data model that autonomously provides relevant solutions. Aspects can thus analyze a single customer issue in real time and correlate the customer issue to all available customer information. As an amount of available data increases, the data model viability improves automatically, and aspects provide a more scalable approach than conventional solutions, which rely on subject matter experts to directly assist in the search process.

FIG. 1 is a block diagram of an example system that includes a query processing component 114. As shown, the system 100 includes a query analysis system 105, a plurality of aircraft 135 and a customer system 170, interconnected by a data communications network 130. The query analysis system 105 includes, without limitation, one or more computer processors 110, a memory 112, and storage 120, each connected to a bus (not shown). The query analysis system 105 may also include an input/output (I/O) device interface (not shown) connecting I/O devices (e.g., keyboard, mouse, and display devices) to the query analysis system 105. Further, in context of this disclosure, the computing elements shown in the query analysis system 105 may correspond to a physical computing system (e.g., a system in a data center) or may be a virtual computing instance executing within a computing cloud.

Generally, an apparatus of example implementations of the present disclosure may comprise, include, or be embodied in one or more fixed or portable electronic devices. Examples of suitable electronic devices include a smartphone, tablet computer, laptop computer, desktop computer, workstation computer, server computer, or the like. The apparatus may include one or more of each of a number of components such as, for example, processor 110, connected to memory 112 (e.g., a Random Access Memory (RAM) device, a storage device, etc.).

Generally, the computer processor 110 retrieves and executes programming instructions stored in the memory 112 as well as stores and retrieves application data residing in the memory 112. The bus is used to transmit programming instructions and application data between computer processor 110, I/O devices interface, storage 120, a network interface (not shown), and memory 112. Note, computer processor 110 is included to be representative of a single CPU, multiple CPUs, a single CPU having multiple processing cores, and the like.

The computer processor 110 generally represents any piece of computer hardware that is capable of processing information such as, for example, data, computer programs, and/or other suitable electronic information. The computer processor 110 is composed of a collection of electronic circuits some of which may be packaged as an integrated circuit or multiple interconnected integrated circuits (an integrated circuit at times more commonly referred to as a "chip"). The computer processor 110 may be configured to execute computer programs, which may be stored onboard the processor or otherwise stored in the memory 112 (of the same or another apparatus). Memory 112 is generally included to be representative of a random access memory. Storage 120 may be a disk drive storage device. Although shown as a single unit, storage 120 may be a combination of fixed and/or removable storage devices, such as fixed disc drives, removable memory cards, or optical storage, network attached storage (NAS), or a storage area-network (SAN).

The computer processor 110 may represent a number of processors, a multi-processor core or some other type of processor, depending on the particular implementation. Further, the computer processor(s) 110 may be implemented using a number of heterogeneous processor systems in which a main processor is present with one or more secondary processors on a single chip. As another illustrative example, the computer processor 110 may be a symmetric multi-processor system containing multiple processors of the same type. In yet another example, the computer processor 110 may be embodied as or otherwise include one or more application-specific integrated circuits (ASICs), field-programmable gate arrays (FPGAs) or the like. Thus, although the computer processor 110 may be capable of executing a computer program to perform one or more functions, the processor of various examples may be capable of performing one or more functions without the aid of a computer program.

The memory 112 generally represents any piece of computer hardware that is capable of storing information such as, for example, data, computer programs (e.g., computer-readable program code) and/or other suitable information either on a temporary basis and/or a permanent basis. The memory 112 may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk-read/write (CD-R/W), digital versatile disk (DVD), or the like. In various instances, the memory 112 may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 112, the processor 110 may also be connected to one or more interfaces for displaying, transmitting and/or receiving information. The interfaces may include a communications interface (e.g., communications unit) and/or one or more user interfaces one example of which may be a network interface. The network interface may be configured to transmit and/or receive information, such as to and/or from another apparatus(es), network(s) or the like. The network interface may be configured to transmit and/or receive information by physical (wired) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor, or the like. The user interfaces may further include one or more interfaces for communicating with peripherals such as printers, scanners or the like.

In this example, the memory 112 contains a query processing component 114, a document pattern matching machine learning model 116 (generally, machine learning model 116), an operating system 118, and (optionally) a secondary term pattern matching machine learning model 124 (generally, secondary machine learning model 124). Although referred to as a single machine learning model, in some aspects the machine learning model 116 can encompass several individual machine learning models that are trained to identify different ordering aspects of natural language text. Each of these aspects may be organized as separate layers of a matrix that define various relationships between the terms based on the identity and relative orders of the terms in the natural language text, and the collective machine learning models can be referred to as the machine learning model 116. Although referred to as a secondary machine learning model 124, the secondary machine learning model 124 may refer to a collection of machine learning models 124 trained to perform various identification tasks on natural language text.

Generally, the operating system 118 represents software that is configured to manage computing hardware and software resources on the query analysis system 105. The operating system 118 may further provide computing services for software applications executing on the query analysis system 105.

Additionally, the query processing component 114 could communicate with the customer system 170 to retrieve the natural language event report data 180. Each aircraft 135 includes sensor devices 145 and an in-service vehicle monitoring system 140, which in-turn includes service event data 150 and sensor event data 160. Generally, the service event data 150 represents diagnostic data (e.g., diagnostics codes and corresponding timestamps at which events classified with the diagnostic codes were detected) collected for the corresponding in-service vehicle. In one aspect, events within the service event data 150 are automatically recorded by control logic within vehicles of the given class of vehicle.

The sensor event data 160 generally represents data collected from the sensor devices 145 on the respective in-service vehicle, such as aircraft 135. Sensor devices 145 may include, without limitation, temperature sensors, pressure sensors, positioning sensors, altitude sensors, and so on. More generally, any sensor suitable for monitoring an attribute of an in-service vehicle can be used, consistent with the functionality described herein. In one aspect, the query analysis system 105 provides a plurality of predefined trigger conditions, each specifying conditional logic for one or more types of sensor data collected from the one or more sensor devices. In such an aspect, upon determining that one or more sensor data values from the one or more sensor devices satisfy one of plurality of predefined trigger conditions, the query analysis system 105 records a sensor event within the sensor event data 160.

The customer system 170 generally represents a computer system through which maintenance event reports can be submitted (e.g., by engineers) and includes natural language event report data 180. Generally, the natural language event report data 180 includes a natural language description of each of a plurality of service events. For example, an engineer could enter (e.g., using a graphical user interface generated by the customer system 170) a textual description of a particular service event, including, for example, the issue experienced, the cause of the issue, and the resolution of the issue.

Generally, the query processing component 114 can receive, from a requesting device, an electronic document specifying natural language text describing a customer issue with an aircraft. For instance, the query processing component 114 could receive the natural language event report data 180 from the customer system 170. As an example, the electronic document could specify the aircraft in question, the area within the aircraft experiencing the issue, the part numbers of any part numbers involved, sensor readings relating to the discrepancy, as well as a natural language description of the issue. An example of such an electronic document is shown in FIG. 4A and discussed in more detail below. More generally, however, the electronic document can include any natural language description of an issue, fault, or discrepancy being experienced with any complex system (e.g., an aircraft, another vehicle, etc.), consistent with the present disclosure.

The query processing component 114 can synthesize the electronic document to create a synthesized electronic document (generally, a synthesized document) for use in identifying relevant documents within a data repository. For example, the query processing component 114 can filter one or more stop words out of the electronic document. Generally, stop words represent common words that are found in nearly every document, with examples of English stop words including, without limitation, "a", "an", "the", "of" and so on. More generally, any words that commonly do not add any semantic meaning to the electronic document can be filtered out, consistent with aspects described herein.

Additionally, the query processing component 114 identifies a first set of terms corresponding to the electronic document to include in the synthesized document, using a data dictionary structure. For example, the data dictionary structure can specify a listing of words that are determined to be relevant terms, and the data dictionary structure may further specify a weight associated with each of the words that indicates a likelihood that the corresponding word is indicative of the issue, discrepancy, or fault represented by the electronic document. For example, a particular document may include several paragraphs of natural language text describing an issue, but a particular phrase specifying that a specific part number has a visible crack could be especially meaningful as to the issue represented by the electronic document and the solution to the represented issue.

Moreover, the query processing component 114 can identify a second set of terms corresponding to the electronic document to include in the synthesized document, wherein at least one term in the second set of terms satisfies at least one predefined format matching rule. For example, a format matching rule can be defined to recognize a format of part numbers used by a particular aircraft part supplier. More generally, however, any type of pattern for an individual term can be used, consistent with the functionality described herein.

The query processing component 114 accesses an index for a data repository using the synthesized document to identify a first set of relevant electronic documents within the data repository. To distinguish the different documents discussed herein, a "seed document" refers to the document on which a query is based, a "candidate document" refers to a document against which the query is performed, a "match document" refers to a candidate document determined to fulfill the query, and an "electronic document" generally refers to any of the seed, candidate, and match documents. The synthesized document refers to a processed version of a corresponding seed, candidate, or match document used to determine which documents are similar in a query. As used herein, a synthesized seed document refers to the synthesized document generated from the seed document, a synthesized candidate document refers to the synthesized document generated from a candidate document, and synthesized match document refers to the synthesized document generated from a match document. For example, the query processing component 114 indexes each candidate document within the data repository based on an evaluation of the contents of the respective synthesized candidate document in view of the data dictionary structure as well as the predefined format matching rules. As such, the query processing component 114 can effectively search the data repository not by directly using the contents of the seed document, but rather by comparing the results of the analysis of the seed document (i.e., the synthesized seed document) with the index structure composed of the synthesized candidate documents generated by performing a similar analysis on the candidate documents stored within the data repository. The query processing component 114 identifies the match documents from the candidate documents within the data repository having similar analysis results (i.e., from the synthesized match documents) to the synthesized seed document.

In one aspect, the query processing component 114 can retrieve metadata specifying an area of the in-service vehicle that the electronic document relates to. For example, when submitting the natural language event report data 180, the user of the customer system 170 can specify an area of the in-service vehicle in question that experienced the issue (e.g., the wing of the aircraft, the landing system, the cockpit, etc.). In one aspect, the electronic document can specify data such as an Air Transport Association of America (ATA) Code (e.g., a Chapter and Subchapter), a model number, and so on that can be used to determine an area of interest within the in-service vehicle that the electronic document relates to. In some aspects, the machine learning model 116 assigns respective weights to at least one of the terms in the first set of terms and the second set of terms, based on the specified area of the in-service vehicle that the electronic document relates to. In other words, the machine learning model 116 can determine that particular terms are particularly indicative of certain issues when used in issue reports 122 for a particular area of the in-service vehicle, but the same terms may be poor indicators of specific events occurring when used in issue reports 122 relating to other areas of the in-service vehicle. As such, the machine learning model 116 can assign different weights to the terms depending on the area of the aircraft corresponding to the natural language event report data 180.

Additionally, when determining the set of terms for the seed document, the query processing component 114 inserts synonyms for words appearing within the seed document into the set of terms. For example, customers may use the term "LH" as shorthand for "left hand" when writing electronic documents detailing event occurrences for an aircraft, and the query processing component 114 could insert the phrase "left hand" into the terms to be considered upon detecting that the acronym "LH" appears within the seed document. Similarly, the query processing component 114 can generate a term that represents a stem word for a word appearing within the seed document for inclusion within the set of terms. As an example, while the seed document could include the word "replacement", the query processing component 114 could include the term "replace" in the set of terms used to determine relevant candidate documents within the data repository, as "replace" is the stem of the word "replacement."

Additionally, the query processing component 114 uses format matching to identify when a plurality of words satisfy one or more predefined matching rules. For example, a matching rule could be defined to identify any phrase of the words "part no." (or any synonyms or variations thereof) followed by an alphanumerical value. Continuing the example, upon determining that the seed document includes the phrase "Part No. 12345", the query processing component 114 could include the term "Part No. 12345" in the set of terms used to determine relevant candidate documents within the electronic data repository.

In various aspects, the query processing component 114 processes the seed document using a machine learning model (e.g., machine learning model 116 and secondary machine learning model 124) to determine a set of relevant terms corresponding to seed the document. For example, a machine learning model could be trained to analyze the seed document detailing the issue and the machine learning model could output one or more terms that are determined to be relevant to the issue or event represented by the seed document. The query processing component 114 could then use the terms identified by the machine learning model to query the data repository to identify relevant previous issue reports 122 held in storage 120 and solutions that relate to the seed document.

Moreover, the machine learning model 116, by identifying several different types of term-orders, enables the query processing component 114 to identify patterns in the term-order data across the different types of term-order data that assign greater semantic meaning to the terms found therein than mere categorization. For example, the machine learning model 116 identifies a first part number and a second part number in a document based on format identification and the machine learning model 116 differentiates, based on the relative positions of the terms in the document, what the intended intent behind the terms is. The machine learning model 116 leans how the relative locations affect the relative semantic meanings of terms, and in various aspects a term may have many different meanings related to location/position in the system, as part of a problem statement or a solution recommendation within the electronic document, relation to other terms (e.g., whether a synthesized document reciting Part A, Part B, Part C, and corrosion is related to corrosion on a particular part A-C or just mentions corrosion and parts A-C). Feedback from users is collected to supplement the dictionary data structure used to parse the documents (e.g., learning new vocabulary and synonyms) and to update the training of the machine learning model 116 to assign semantic meaning to the terms found in the natural language documents.

In some aspects, the machine learning model 116 is a support vector machine (SVM) model (or similar model) that uses multi-dimensional weights to analyze unstructured documents including natural language text to identify semantic context for the natural language text based on term-orders found in the text. The identified term-order data are associated with how specific terms found in the natural language text of the original document are organized relative to one another, and enable the query processing component 114 to search for documents with similar semantic meanings based on similar term-orders. The term-order data are organized into a matrix of based on how the term-order data were derived (e.g., a first layer or dimension related to values derived based on methodology X, a second layer or dimension related to values derived based on methodology Y, etc.). For example, a first matrix layer can identify the terms found in the document, while a second matrix layer can identify the locations in the document in which those terms are found. Other example matrix layers may include: the categories of the terms identified from the document, the frequency at which a term occurs in the document, a relative order of the term to other terms in the document, a frequency at which a given category occurs in the document, and an order of the categories in the document. The machine learning model 116 may discriminate between various documents being related or unrelated based on a hyperplane bisecting one or more clusters of documents that are clustered based on similarities according to one or more matrix layers.

The query processing component 114 compares one or more of the matrix layers stored in the synthesized document for a given electronic document against the corresponding one or more matrix layers for previously analyzed electronic documents to identify documents relating to similar issues or solutions, but may present the individual terms in different orders, or use different terms to discuss similar issues. In some aspects, the query processing component 114 determines a set of match documents from the candidate documents in the document repository based on one or more matrix layers, and ranks the set of match documents using a different one or more matrix layers. For example, if the set of match documents all include the same terms (e.g., a first matrix layer), the query processing component 114 may determine which match documents from the set to prioritize for display to a user based on which match documents have the most similar term-order (e.g., a second matrix layer) to the seed document. In various aspects, a user may specify which matrix layers the query processing component 114 uses to identify match documents from the candidate documents, and which matrix layers the query processing component 114 uses to rank for display the match documents.

The machine learning model 116 is trained with a supervised dataset to learn how to identify the term-orders in document. Supervised machine learning, as compared to unsupervised machine learning, trains the machine learning model 116 using a training dataset curated to have known desired outputs paired with known inputs. When trained, the machine learning model 116 generalizes a function to analyze the inputs from the training dataset to produce the paired known outputs. The machine learning model 116 uses the generalized function developed during training to analyze the electronic documents in a corpus of previously submitted and analyzed electronic documents to develop the index structure that describes the individual document based on the terms therein and the relationships between those terms. In some aspects, the query processing component 114 receives user input to the queries, indicating whether a given match document was relevant to the user, and the query processing component 114 expands the supervised training dataset based on the user feedback—using the feedback to provide the known output for the inputs provided by the document. The machine learning model 116 may be periodically retrained as the query processing component 114 builds or updates the training dataset with examples based on user feedback.

A machine learning model 116 may be used in conjunction with a secondary machine learning model 124 designed and trained to identify term formats, synonyms, and update a data dictionary. The secondary machine learning model 124 may receive feedback from users to supplement the dictionary data structure used to parse the documents (e.g., learning new vocabulary and synonyms) and to update the training of the machine learning model 116 training to assign semantic meaning to the terms found in the natural language documents.

Figure 2:
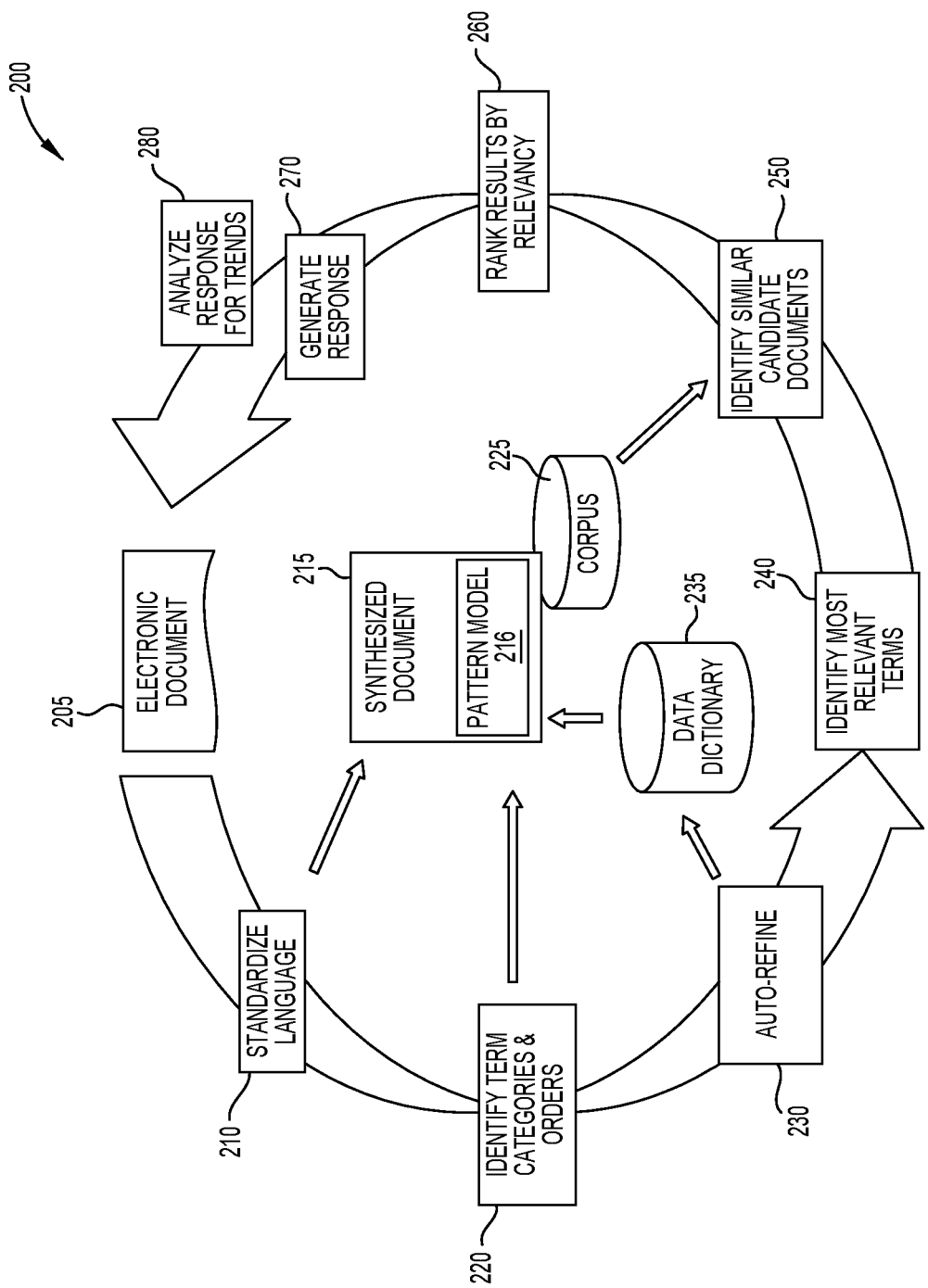
FIG. 2 illustrates a workflow for processing an electronic document to identify potential solutions to an issue represented by the electronic document, according to aspects of the present disclosure

FIG. 2 illustrates a workflow 200 for processing an electronic document 205 to identify potential solutions to an issue represented by the electronic document 205, according to aspects of the present disclosure. As shown, the workflow 200 depicts the operations of a natural language processing (NLP) system, such as the system 100 of FIG. 1, and the workflow 200 begins when the query processing component 114 receives an electronic document 205 for use as a seed document and/or candidate document containing a natural language description of a complex system (e.g., an aircraft) to be processed against a data repository containing searchable data.

The workflow 200 continues to blocks 210-230, where a query processing component (such as the query processing component 114 of FIG. 1) synthesizes the received electronic document 205 into a synthesized document 215 that includes a set of terms and/or term-orders found in the electronic document 205 to form the basis of a search query and/or a set of candidate data that is available for later search queries. The synthesized document 215 may be used to search against one or more corpora 225 of synthesized documents 215 by identifying synthesized documents 215 having similar sets of terms and/or similar pattern models 216. Once synthesis is complete, the synthesized document 215 is added to the corpus 225, and the received electronic document 205 may be returned in a search using a subsequent electronic document 205 against the corpus 225 to return the synthesized document 215 and/or the associated electronic document 205.

At block 210, the query processing component standardizes the searchable language found in the natural language electronic document 205. For example, the query processing component removes any stop words and/or other portions of the electronic document 205 determined to have little to no bearing on the semantic meaning of the electronic document 205. The query processing component 114 may apply one or more filtering rules to remove certain stop words (e.g., "a," "the," "to," etc.) or word groups (e.g., references to attachments, salutations, signatures, etc.) from the electronic document 205 when creating the synthesized document 215.

At block 220, a machine learning model (such as machine learning model 116 and/or the secondary machine learning model 124 in FIG. 1) identifies term categories and term-orders in the electronic document 205. Example term categories include: locational, temporal, part identity, standard identity, issue subject, solution identity, action predicate, modifier, etc. Locational terms identify where an issue or a part included in an issue are located in the complex system. Temporal terms identify how long an issue has been ongoing, how long a solution will take to implement, how long a solution will be in place (e.g., until a second solution can be implemented), etc. Part identity terms identify which part is being affected by an issue or is being suggested in a solution. Standard identity terms identify a standard, manual, law, best-practice or other guideline used in identifying or addressing an issue. An issue subject term identifies what aspect of the complex system is being affected by the issue. A solution identity term identifies a proposed solution to the issue. An action predicate term identifies how the issue subject is to be interpreted relative to the solution identity (e.g., replace, omit, substitute, request, allow). A modifier term adds emphasis and provides description to another term, such as, for example, specific portions of a part, a specific sub-portion of a standard, a sub-location, a time, etc., and may also identify efficacy and/or approval status of a solution to an issue (e.g., vulcanize per standard XYZ, threads of part ABC, approval of proposed solution). A given term may be categorized in one or more categories (e.g., a "left door panel" may be a part identity term and a locational term).

The machine learning model identifies and determines relationships between the categorized terms based on the relative orders and sequences of the terms in the natural language text. Stated differently, the term-orders for the terms identified and classified in the document are identified by the machine learning model. For example, the sentence "Front Passenger Door Trim xxx1234 Finishing" may be identified as including "Front Passenger Door" and "Trim" as locations for a part number term "xxx1234" and the "Finishing" term may be identified as the issue subject. In various aspects, the relative arrangement of given categories of terms define one or more term-orders, such as the term-order of "Locational Locational→Part Number→Issue Subject" in the above example. The machine learning model uses the relationship data to determine how the terms interact with one another to provide a "shape" for the natural language text, which can be used during a search to identify similarly shaped prior electronic documents 205 from the corpus 225. The term-orders of the various terms in a given natural language text, and the frequency at which a given term is found, define the "shape" of the electronic document 205, and may affect the semantic meaning of the text.

The machine learning model identifies the frequencies and term-orders in the natural language text, and includes these data in the term-order data in the synthesized document 215 as pattern models 216 to be search on and against. A pattern model 216 represents a known or learned cluster of similar or related documents based on similar values found in a designated set of the matrix layers. In some aspects, a pattern model 216 may recognize the natural language formatting re-used in issue reports by various maintenance personnel, engineers, and other persons submitting, modifying, or reviewing the issue reports. For example, when a technician copies and pastes the text of a prior issue into a reporting application and modifies pertinent terms to match the current issue, the two issue reports may share a same shape for their natural language text. Over time, as more issue reports use the same format, a pattern model 216 is developed that represents the shape of similar reports. The repeated use of similar shapes across different documents over time allows the query processing component to identify documents that are semantically similar to one another, but that may include different component names/number. For example, documents with a similar shape may address similar issues, despite including different parts, and provide similar solutions. For example, a historic solution that recommends a technician to galvanize part "xxx1234" with a zinc coating may be relevant to a current issue affecting part "yyyy5678," which the machine learning model identifies as having the same shape to the associated natural language text.

At block 230, the query processing component auto-refines the synthesized document 215 from the electronic document 205. Auto-refining identifies terms found in the electronic document 205 that are known (according to a data dictionary 235) to have synonyms, abbreviations, or stem words, and includes those alternatives in the synthesized document 215 associated with the electronic document 205. For example, when the query processing component identifies the term "Left Hand" in the text of the electronic document 205, an abbreviation of "LH" may be identified in the data dictionary 235 and be included in the synthesized document 215. In another example, the term "finishing" or "finished" may be mapped to a stem word of "finish" from the data dictionary 235, and the query processing component may include the stem word in the synthesized document 215.

Generally, the data dictionary 235 includes several terms selected by subject matter experts or the machine learning model that are determined to be related to or indicative of various issues that may occur in the complex system or be searched against. The query processing component attempts to map terms found within the electronic document 205 against those listed in the data dictionary 235, and includes those terms found in the data dictionary 235 and the electronic document 205 in the first set of terms that are used in creating a synthesized document from the electronic document 205.

At block 240, the query processing component identifies the most relevant terms included in the natural language of the electronic document 205. In various aspects, the data dictionary 235 specifies the weights of the various terms identified therefrom. In other aspects, the machine learning model identifies the weight to assign a given term based on the location of the term in the electronic document 205 (e.g., higher weights for terms found in a subject line than in the body), the frequency at which a given term appears, and the term-orders in which a given term appears.

After block 240, the query processing component can then initiate the search of the corpus 225 to identify similar issue reports and the corresponding solutions. At block 250, the query processing component identifies one or more similar candidate documents (and their corresponding solutions) from the corpus 225 that include similar sets of terms and/or term-orders that define similar shapes for the electronic documents 205. At block 260, the query processing component ranks the results for ordered display on a requesting user device, for example, by determining which similar historic documents most closely share the term-order with the received electronic document 205. Additionally, the query processing component can apply pre-defined ranking criteria for issue reports (e.g., most recent first, prioritize specified authors, prioritize approved solutions) and, if so, can alter the generated ranking accordingly.

At block 270, the query processing component generates a response (e.g., a proposed solution set) to the issue described by the electronic document, and at block 280 the query processing component analyses the response(s) for trends. In one aspect, the returned response can include a ranked listing of two or more potential solutions. The query processing component can determine the potential solutions based on the set of solutions corresponding to the identified set of relevant electronic documents within the corpus 225. For example, the query processing component could determine a measure of relevancy for each of the electronic documents 205 within the corpus 225, where the measure of relevancy reflects the determined relevancy between the received electronic document 205 (i.e., the document containing the natural language description of a current issue) and the respective electronic document 205 within the corpus 225 (e.g., specifying a natural language description of a historical issue).

In one aspect, the query processing component is configured to identify a first set of relevant electronic documents using the synthesized document 215, and the machine learning model produces a second set of relevant electronic documents. The query processing component can then correlate the first and second sets of relevant electronic documents to generate an aggregate set of relevant documents. In doing so, the query processing component can adjust the measures of relevancy from the first and second sets of relevant electronic documents as part of a trend analysis operation. For example, if the query processing component determines that a particular previously analyzed electronic document 205 was identified in both the first and second sets of relevant electronic documents for a newly submitted seed electronic document 205, the query processing component could increase the measure of relevancy for the particular electronic document 205 (e.g., by combining the measure of relevancy for the particular electronic document 205 in the first set with the measure of relevancy for the particular electronic document 205 in the second set). The query processing component could then cluster the set of solutions (e.g., a natural language description of how the historical issue was addressed) to generate two or more solution groups. The query processing component could then determine the two or more potential solutions corresponding to the generated solution groups. The query processing component could then determine a measure of relevancy for each of the generated solution groups, based on the measures of relevancy for the various electronic documents 205 assigned to each group and trends therein.

The query processing component could then rank the potential solutions, based on the measures of relevancy for the various electronic documents assigned to each group. For example, the query processing component could determine that twenty electronic documents within the corpus 225 are sufficiently relevant to the received electronic document 205. The query processing component could then determine that the twenty electronic documents correspond to two different solutions (i.e., the issues described in the twenty electronic documents were solved using one of two different solutions). The query processing component could further determine a ranking of the two different solutions, based on the trends and measures of relevancy for the electronic documents corresponding to the solutions. For example, if the ten most relevant documents describe issues that were solved using a first solution, and the remaining documents in the set of identified documents were solved using a second solution, the query processing component could rank the first solution ahead of the second solution in returning the solutions to the requesting entity.

As another example, the query processing component can consider the frequency of use of the various solutions in determining the ranking by counting and comparing how often a given solution is reported in the candidate electronic documents 205. For example, if eighteen of the twenty electronic documents describe issues that were solved using a third solution, and the remaining two electronic documents were solved using a fourth solution, the query processing component could prioritize the third solution over the fourth solution in the ranking, as the third solution was used a significant number of times more than the fourth solution. As a further example, the query processing component can consider the timing of the various solutions in determining the ranking. For example, if ten of the twenty electronic documents advocate for a fifth solution and a sixth solution, but a majority of the recommendations for the sixth solution were received more recently than the recommendations for the fifth solution, the query processing component could prioritize the sixth solution over the fifth solution in the ranking, as the sixth solution appears to be superseding the fifth solution in the field.

The query processing component can then provide the solution(s) to the requesting entity from which the electronic document was received (e.g., the owner and/or operator of the complex system in question). For example, the query processing component could correlate the results of accessing the corpus 225 and can generate an electronic report detailing the identified solution(s) to the issue or situation described by the electronic document. Such a solution(s) can then be reviewed and implemented by users (e.g., engineers that service the complex system in question) to address the issue or situation raised in the electronic document that was processed by the query processing component. Advantageously, aspects provide a technical solution to the technical challenge of automatically identifying relevant natural language text data within a corpus 225, e.g., by processing a received electronic document 205 containing natural language text and to generate a synthesized document 215 for use in accessing an index structure for the corpus 225.

Figure 3:
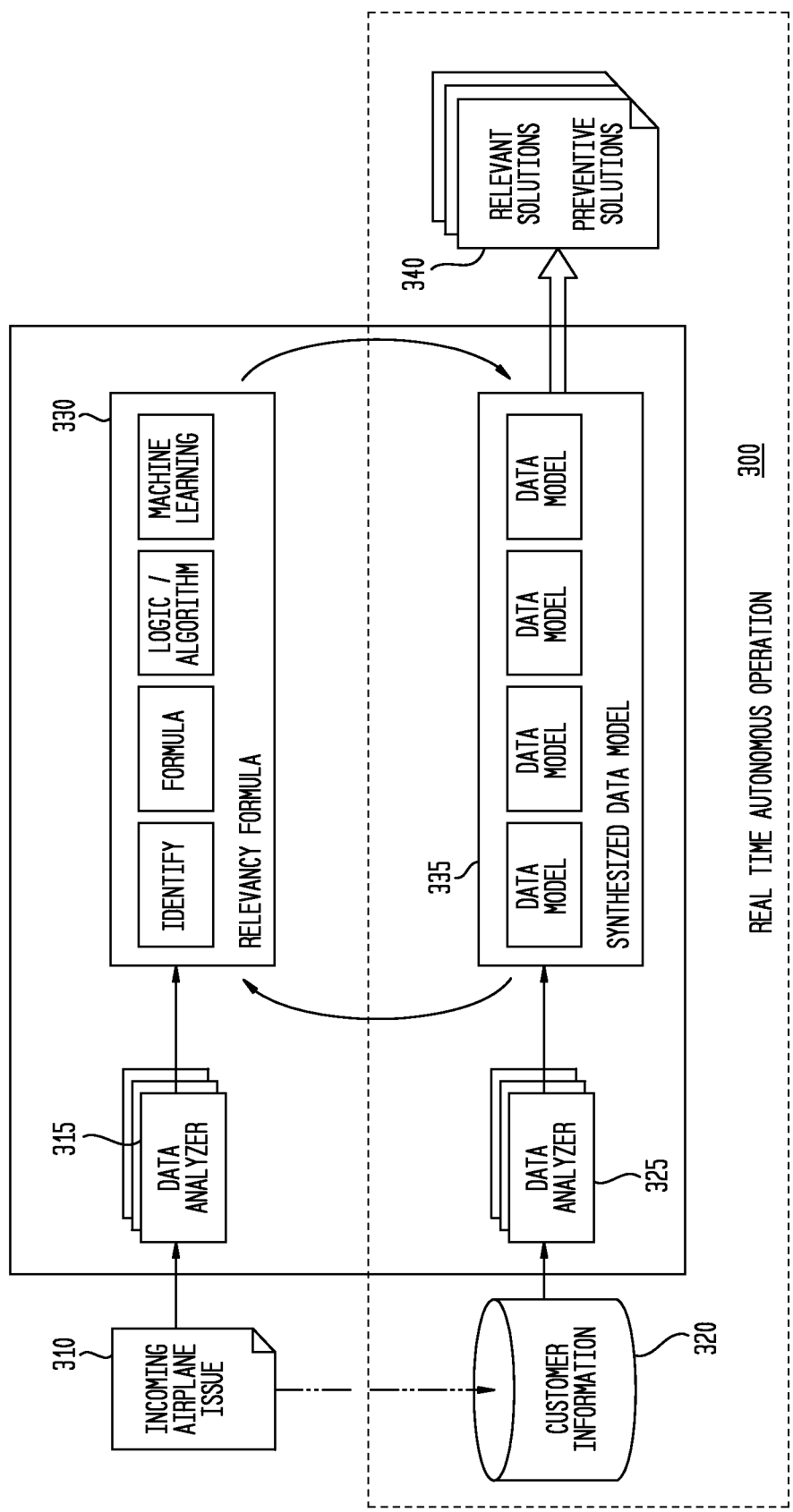
FIG. 3 illustrates a workflow for a two-tiered approach to processing an electronic document to identify potential solutions to an issue represented by the electronic document, according to one aspect of the present disclosure.

FIG. 3 illustrates a workflow for a two-tiered approach to processing an electronic document to identify potential solutions to an issue represented by the electronic document, according to one aspect of the present disclosure. As shown, the workflow 300 begins at block 310, where a query processing component (such as query processing component 114 of FIG. 1) receives an electronic document detailing an incoming airplane issue using natural language text. The query processing component then analyzes the electronic document using a two-tiered approach. For example, the query processing component could retrieve customer information 320 specific to the electronic document (e.g., issue, faults, and discrepancies previously experienced by the customer, terminology and acronyms commonly used in electronic documents written by the customer, etc.), and the data analyzer component 325 extracts relevant terms and other metadata from the electronic document, for input into the data models 335. Generally, the data models 335 are configured to identify documents (and corresponding solutions) within a data repository that correspond to the received inputs (e.g., the extracted terms and other metadata).

Additionally, the query processing component analyzes the electronic document using the data analyzer 315, which uses multiple techniques to extract key terms from the electronic document, for use in identifying similar customer-reported issues and their corresponding solutions. In doing so, the query processing component can use a combination of search techniques, format matching formulas, computer logic, and algorithms and machine learning techniques to identify relevant customer-reported issues and the corresponding solutions, based on the results of the analysis of the incoming electronic document performed by the data analyzer 315. The results of the analysis by the data models 335 and the analysis of the relevancy formula 330 can then be compiled to provide relevant solutions as well as preventative solutions 340 to the client.

FIGS. 4A-4E illustrate terms identified within an electronic document through various term-identification techniques, according to aspects of the present disclosure. As shown, FIG. 4A illustrates a view 400 of the associated synthesized document for the natural language text of an electronic document where a number of stop words and inconsequential phrases have been removed by a language standardization operation. For example, the words "of", "the", "that", "to" and so on have all been removed from the document, as these stop words are commonly used across the majority of documents and provide little semantic meaning to the document in question. Additionally, the phrase "shown in view /A/ and B/" has been removed. In the present example, assume that a regular expression was created to remove this (and similar) phrases, as these phrases alone add little to the semantic meaning of the document (e.g., the phrase merely refers to the attached images, and adds no value in and of itself). Moreover, as shown, the query processing component has added additional terms corresponding to synonyms and stem words of the identified terms to a synthesized document used to identify relevant electronic documents within a data repository. In the depicted example, the terms "Left Hand" have been added, responsive to the query processing component determining that the acronym "LH" is a predefined acronym corresponding to the terms "Left Hand." Moreover, the query processing component 114 has added the term "Finish" to the synthesized document, based on the usage of the word "Finishing" within the document and based a determination that "Finish" is the stem word of "Finishing."

FIG. 4B illustrates a view 420 of the associated synthesized document for the natural language text of an electronic document where the query processing component has analyzed the incoming document and has identified a set of terms (or keywords) within the document using a data dictionary. The identified terms are shown in bold, where terms such as "LEFT CAR DOOR TRIM" and "PLATING PROCESS" have been identified as potentially important terms within the document, based on the presence of these terms within the data dictionary. Generally, the data dictionary can be constructed to include terms that are commonly indicative of the maintenance issue, fault, or discrepancy corresponding to the electronic document containing the terms.

FIG. 4C illustrates a view 440 of the associated synthesized document for the natural language text of a document where the query processing component has analyzed the document using a trained machine learning model (such as the machine learning model 116 of FIG. 1) and has identified particular terms as relevant (shown in underlined text). Thus, in the depicted example, the machine learning model determined that terms such as "finish treatment" and "plating process" are relevant, while other terms such as "recorded lead time" are not.

Furthermore, FIG. 4D illustrates a view 460 of the results of a format matching analysis on the received natural language text of an electronic document, with the identified terms appearing in bold and underlined font. For example, in the depicted aspect, the query processing component has determined that the part numbers "P/N XXXX1234" and "P/N XXXX2345" satisfy predefined format matching results for identifying part numbers following a particular naming convention and appearing within electronic documents. As such, the query processing component can include the highlighted terms when generating a synthesized document for use in formulating a query for the data repository.

FIG. 4E illustrates the results 480 of categorization analysis on the received natural language text of an electronic document, with terms belonging to a first category appearing in a bold font, terms belonging to a second category appearing in an italic font, and terms belonging to a third category appearing in an underlined font. For example, in the illustrated example the terms "door," "P/N XXXX1234" and "P/N XXXX2345" are identified as belonging to a first term category (e.g., part identifier); "Left Car Door" and "LH driver's door" are identified as belonging to a second term category (e.g., location identifier); and "plating process," "plating process," "refinishing" and "finish treatment" are identified as belonging to a third term category (e.g., issue identifier). As illustrated, the term "door" and constructions involving the word "door" has been classified in two categories (e.g., both part identifier and location identifier). Although three categories are listed and illustrated in the current example, other aspects may use more than or fewer than three categories, or may use categories that are not found in the natural language text.

A machine learning model may be configured to generate an index structure from the identified and categorized terms in the seed document that identify the terms and the semantic meaning of the terms in one or more searchable layers of a matrix of term-order data developed from an electronic document. For example, the index structure may identify in separate layers one or more of: the identities of the terms found in the seed document, the semantic relationships of the terms based on the identities of the terms found in the document, the locations in the document at which the terms are found, the categories assigned to the terms, the frequencies at which individual terms found in the document appear, a relative order of the terms to one another within the document, the frequencies at which individual categories found in the document appear, an order in which the categories found in the document appear, etc.

Once the terms are identified and the relationships between the terms (i.e., the term-order data) are identified, the query processing component can initiate an operation (or multiple operations) for determining relevant candidate electronic documents within the corpus of a data repository and can determine a set of relevant issue reports and their corresponding solutions. For example, the query processing component could perform several different operations using the various sets of terms and term-orders identified within the candidate electronic documents (e.g., the highlighted terms shown in FIGS. 4A-4E) and could perform a correlation operation to reconcile the various results into a single aggregated set of results. Such a set of aggregated results could then be displayed in a graphical user interface, as shown in FIG. 5, which depicts a graphical user interface 500 representing exemplary query results, according to one aspect of the present disclosure. As shown, the graphical user interface 500 depicts various submission identifiers that uniquely identify the previous issue reports that were found to be relevant to the seed electronic document, as well as natural language descriptions of the relevant historical reports. The graphical user interface 500 could be configured so that when a user selects one of the relevant historical reports, additional description of the selected report is displayed, as well as any solution data pertaining to the selected report (e.g., a natural language write-up of how the issue detailed in the historical report was addressed, as well as any part numbers or service bulletins relating to the issue).

In some aspects, the query processing component selects the match documents to populate the graphical user interface 500 based on a first layer (or set of layers) from a matrix of the semantic features for the match documents, and determines the order in which those match documents are presented in the graphical user interface 500 based on a second layer (or set of layers) from the semantic features. For example, the query processing component may select the ten documents shown in the example from a corpus of several thousand candidate documents based on a best-match to identified terms found in the semantic features (e.g., a first layer of the synthesized document), and organize the returned documents according to a best-match to the term-order data (e.g., a second layer) to a given semantic features. For example, a first document shown in an uppermost portion of the graphical user interface 500 (e.g., with the subject "Hood surface finish") may have a term-order more similar to a seed document (on which the query is based) than a second document shown below the first document (e.g., with the subject "PASSENGER DOOR FINISH") despite the second document having a closer match to the seed document based on identified terms.

Figure 6:
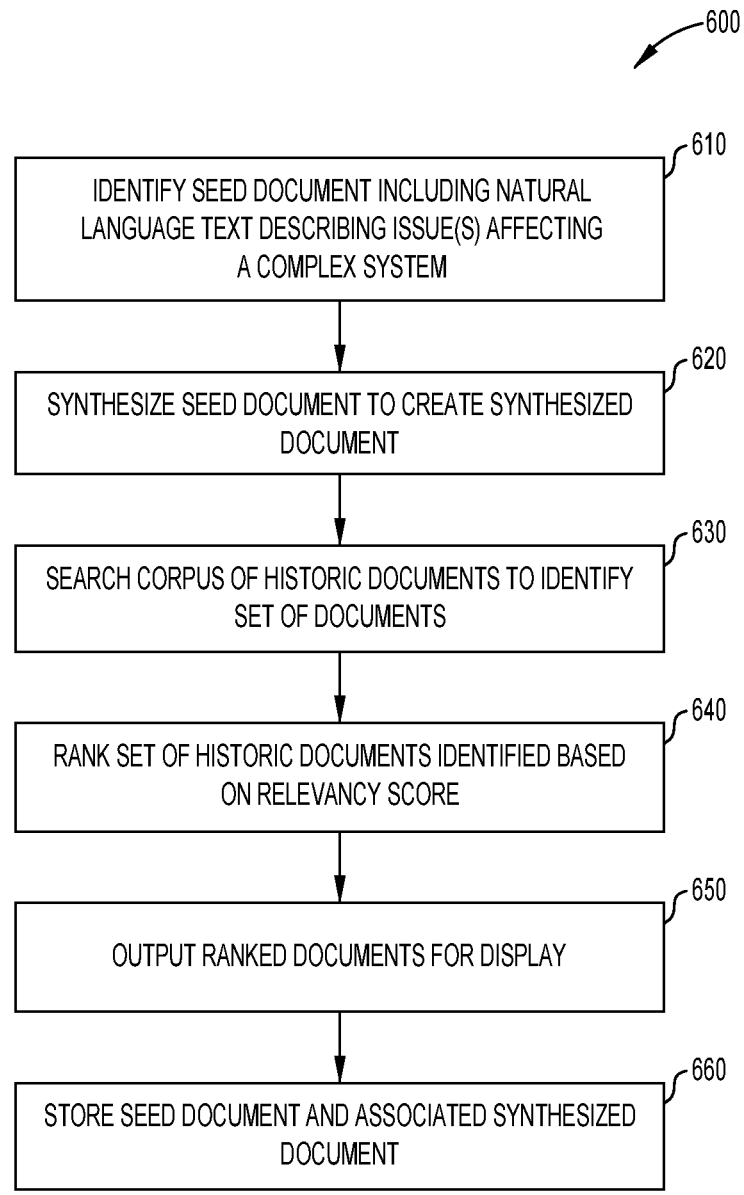
FIG. 6 illustrates a flowchart of a method for identifying a set of documents in a corpus that are relevant to a seed document on which a query is based, according to aspects of the present disclosure.

FIG. 6 illustrates a flowchart of a method 600 for identifying a set of documents in a corpus that are relevant to a seed document on which a query is based. Method 600 begins with block 610, where an NLP search system identifies an electronic document to use as a seed document for a query. In some aspects, the identified document is received from a requesting device posing a query to the NLP search system. The seed document includes natural language text describing an issue with a complex system in an unstructured format, such as, for example, an issue write-up or situation report provided in an email document, word processor document, or report document.

At block 620, the NLP search system synthesizes the electronic document to create a synthesized document. To create the synthesized document, the NLP search system removes a portion of the electronic document that is determined to satisfy a predefined filtering rule, identifies a first set of terms included in the natural language text that map to terminology identified in a data dictionary, and extracts term-order data based on locations of the first set of terms in the natural language text. The NLP search system includes the first set of terms and the term-order data in the matrix of the synthesized document. In some aspects, the first set of terms are included in a different layer of a searchable matrix than the term-order data. In some aspects, synthesizing the electronic document also includes categorizing terms included in the first set of terms and extracting the term-order data also includes determining relationships between the terms based on categories assigned to the terms and a relative order of the terms in the natural language text. The categories that the terms may be classified into include one or more of: locational terms, temporal terms, part identity terms, standard identity terms, issue subject terms, solution identity terms, action predicate terms, and modifier terms.

In some aspects, the NLP search system extracts multiple sets of terms at block 620 based on different data dictionaries, different term matching rules (e.g., a secondary machine learning model), different format matching rules (e.g., part numbers, standards numbers), etc. For example, the NLP search system may identify a second set of terms included in the natural language text that map to a predefined format matching rule and include the second set of terms in the semantic matrix for the seed document, and includes term-order data further based on locations of the second set of terms in the natural language text in the semantic matrix.

At block 630, the NLP search system uses the synthesized document of the seed document to search a corpus of historic electronic documents, (maintained as candidate documents with associated synthesized documents), to identify a first set of historic documents that are related to the seed document.

In some aspects, the NLP search system uses a machine learning model to identify similar historic documents to the seed document. The machine learning model identifies several features of the natural language text of the seed document (i.e., the layers of the matrix), and the NLP search system compares these features of the seed document to the previously identified features of the candidate documents. When the searched-on features of the seed document indicate that the seed document would belong to a given group or subset of the candidate documents (e.g., on one side of a hyperplane or as a member of a cluster of candidate documents having similar features), those candidate documents may be returned as match documents to the seed document. The NLP search system may use one or more sets of term-order data from a corresponding one or more layers of the matrix to identify which candidate documents are match documents to the seed document. Stated differently, the NLP search system determines which pattern model(s) that the seed document is most closely related to or would belong to if clustered with similar documents in the corpus of historically submitted and analyzed electronic documents. The machine learning model may cluster the historic documents into several different searchable clusters/pattern models based on different data layers in the pattern models. For example, a first document may be clustered with a second document (and not a third document) in clusters based on the term identities found in the natural language text of the respective documents, but may be clustered with the third document (and not the second document) in clusters based on the term-order of the terms found in the natural language text of those documents. For example, when searching for related historical documents, if the NLP system determines, based on term-order data, that the seed document would be clustered into a first cluster of historic documents (and not be clustered into a second cluster), the NLP system then identifies those historic electronic documents that belong to the first cluster (and not those belonging to the second cluster) as related to the electronic document as the first set of historic documents.

At block 640, the NLP search system ranks the first set of electronic documents for display on the requesting device based on a relevancy score. In various aspects, the relevancy score is assigned to the historic document based on the term-order data. In various aspects, a user may specify one or more of the layers of a searchable matrix to use to provide the term-order data on which the relevancy score is based.

At block 650, the NLP search system outputs at least a portion of the first set of electronic documents in response to the query. The output portion may be transmitted and returned to a requesting device or a designated or transmitted to a designated third device for display. The user may select one or more of the presented electronic documents from a graphical user interface to view an individual electronic document. In various aspects, the NLP search system may query the user for whether the selected document was helpful or related to the seed document. In various aspects, the NLP search system uses the user input to update the machine learning model by adding examples to the training dataset, reclassifying examples in the training dataset, adding additional terminology found in the seed document to the data dictionary, etc.

At block 660, after the synthesized document is created and the query is complete, the NLP search system may store the seed document and the associated synthesized document in the corpus of historic documents for use in future queries. Method 600 may then conclude.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method, comprising:
   identifying a seed electronic document including natural language text describing an issue with a complex system;
   creating a synthesized document for the seed electronic document by:
      removing a portion of the seed electronic document that is determined to satisfy a predefined filtering rule;
      identifying a first set of terms included in the natural language text that map to terminology identified in a data dictionary;
      extracting, using a machine learning model, term-order data based on locations of the first set of terms in the natural language text, wherein the term-order data identify how the first set of terms interact with one another to affect a semantic meaning of the natural language text;
      assigning, using the machine learning model, a weight to at least one term in the first set of terms based on a physical area of the complex system associated with the issue;
      including the first set of terms, the term-order data, and the assigned weight in the synthesized document; and
   generating an index structure from the identified first set of terms in the seed electronic document, wherein the index structure identifies the first set of terms and corresponding semantic meanings of the terms in one or more searchable layers of the index structure;
   identifying, from a corpus of historic electronic documents, a first set of historic electronic documents that are related to the seed electronic document using a two-tiered query at a query processing component comprising a first data analyzer component and a second data analyzer component,
      wherein a first tier query utilizes the first data analyzer component and comprises information specific to the seed electronic document and the complex system, and wherein the first data analyzer component outputs a relevancy formula based on the information specific to the seed electronic document and the complex system, and
      wherein a second tier query utilizes the second data analyzer component and is defined by user specified layers in the index structure and comprises the term-order data included in the synthesized document as a search feature for the first set of historic electronic documents to match against, wherein the second data analyzer component outputs a synthesized set of data models, and wherein the query processing component updates the synthesized set of data models using the relevancy formula to search the first set of historic electronic; and
   outputting at least a portion of the first set of historic electronic documents.

2. The method of claim 1, wherein synthesizing the seed electronic document further comprises categorizing terms included in the first set of terms; and
   wherein extracting the term-order data includes determining relationships between the terms based on categories assigned to the terms and a relative order of the terms in the natural language text.

3. The method of claim 2, wherein the terms are categorized into one or more of the categories, and wherein the categories include:
   locational terms;
   temporal terms;
   part identity terms;
   standard identity terms;
   issue subject terms;
   solution identity terms;
   action predicate terms; and
   modifier terms.

4. The method of claim 1, further comprising:
   in response to receiving user selection of a given historic electronic document of the first set of historic electronic documents, updating the machine learning model used to extract the term-order data based on the user selection.

5. The method of claim 1, further comprising:
   analyzing the historic electronic documents;
   identifying an additional term included in the historic electronic documents at a predefined frequency of use; and adding the additional term to the terminology stored in the data dictionary.

6. The method of claim 1, further comprising:

identifying a second set of terms included in the natural language text that map to a predefined format matching rule; and including the second set of terms in the synthesized document, wherein extracting the term-order data is further based on locations of the second set of terms in the natural language text.

7. The method of claim 1, further comprising:

ranking the first set of historic electronic documents for display on a requesting device based on a relevancy score assigned according to the term-order data.

8. The method of claim 7, further comprising:

ranking a second set of historic electronic documents for display on the requesting device in combination with the first set of historic electronic documents based on a relevancy score assigned according to the term-order data.

9. The method of claim 1, wherein identifying the first set of historic electronic documents that are related to the seed electronic document further comprises:

clustering the historic electronic documents based on historic term-order data associated with the historic electronic documents;

determining which clusters of the historic electronic documents the seed electronic document belongs to based on the term-order data; and categorizing the historic electronic documents that belong to the clusters that the seed electronic document is determined to belong to as match electronic documents to the seed electronic document, wherein match electronic documents are determined to be related to the seed electronic document.

10. A system, comprising:

a processor; and a memory storage device, including instructions that when performed by the processor perform an operation comprising:

identifying a seed electronic document including natural language text describing an issue with a complex system;

creating a synthesized document for the seed electronic document by:

removing a portion of the seed electronic document that is determined to satisfy a predefined filtering rule;

identifying a first set of terms included in the natural language text that map to terminology identified in a data dictionary;

extracting, using a machine learning model, term-order data based on locations of the first set of terms in the natural language text, wherein the term-order data identify how the first set of terms interact with one another to affect a semantic meaning of the natural language text;

assigning, using the machine learning model, a weight to at least one term in the first set of terms based on a physical area of the complex system associated with the issue;

including the first set of terms, the term-order data, and the assigned weight in the synthesized document; and generating an index structure from the identified first set of terms in the seed electronic document, wherein the index structure identifies the first set of terms and corresponding semantic meanings of the terms in one or more searchable layers of the index structure;

identifying, from a corpus of historic electronic documents, a first set of historic electronic documents that are related to the seed electronic document using a two-tiered query at a query processing component comprising a first data analyzer component and a second data analyzer component, wherein a first tier query utilizes the first data analyzer component and comprises information specific to the seed electronic document and the complex system, and wherein the first data analyzer component outputs a relevancy formula based on the information specific to the seed electronic document and the complex system, and wherein a second tier query utilizes the second data analyzer component and is defined by user specified layers in the index structure and comprises the term-order data included in the synthesized document as a search feature for the first set of historic electronic documents to match against, wherein the second data analyzer component outputs a synthesized set of data models, and wherein the query processing component updates the synthesized set of data models using the relevancy formula to search the first set of historic electronic; and outputting at least a portion of the first set of historic electronic documents.

11. The system of claim 10, wherein the operation further comprises:

categorizing terms included in the first set of terms; and wherein extracting the term-order data includes determining relationships between the terms based on categories assigned to the terms and a relative order of the terms in the natural language text.

12. The system of claim 10, wherein the operation further comprises:

in response to receiving user selection of a given historic electronic document of the first set of historic electronic documents, updating the machine learning model used to extract the term-order data based on the user selection.

13. The system of claim 10, wherein the operation further comprises:

ranking the first set of historic electronic documents for display on a requesting device based on a relevancy score assigned according to the term-order data.

14. The system of claim 10, wherein identifying the first set of historic electronic documents that are related to the synthesized document further comprises:

clustering the historic electronic documents based on historic term-order data associated with the historic electronic documents;

determining which clusters of the historic electronic documents the seed electronic document belongs to based on the term-order data; and categorizing the historic electronic documents that belong to the clusters that the seed electronic document is determined to belong to as match electronic documents to the seed electronic document, wherein match electronic documents are determined to be related to the seed electronic document.

15. A computer readable storage medium including instructions that when performed by a computer processor enable the computer processor to:

identify a seed electronic document including natural language text describing an issue with a complex system;

create a synthesized document, for the seed electronic document wherein to create the synthesized document the instructions further enable the computer processor to:

remove a portion of the seed electronic document that is determined to satisfy a predefined filtering rule;

identify a first set of terms included in the natural language text that map to terminology identified in a data dictionary;

extract, using a machine learning model, term-order data based on locations of the first set of terms in the natural language text, wherein the term-order data identify how the first set of terms interact with one another to affect a semantic meaning of the natural language text;

assign, using the machine learning model, a weight to at least one term in the first set of terms based on a physical area of the complex system associated with the issue;

include the first set of terms, the term-order data, and the assigned weight in the synthesized document; and generate an index structure from the identified first set of terms in the seed electronic document, wherein the index structure identifies the first set of terms and corresponding semantic meanings of the terms in one or more searchable layers of the index structure;

identify, from a corpus of historic electronic documents, a first set of historic electronic documents that are related to the seed electronic document using a two-tiered query at a query processing component comprising a first data analyzer component and a second data analyzer component, wherein a first tier query utilizes the first data analyzer component and comprises information specific to the seed electronic document and the complex system, and wherein the first data analyzer component outputs a relevancy formula based on the information specific to the seed electronic document and the complex system, and wherein a second tier query utilizes the second data analyzer component and is defined by user specified layers in the index structure and comprises the term-order data included in the synthesized document as a search feature for the first set of historic electronic documents to match against, wherein the second data analyzer component outputs a synthesized set of data models, and wherein the query processing component updates the synthesized set of data models using the relevancy formula to search the first set of historic electronic; and output at least a portion of the first set of historic electronic documents.

16. The computer readable storage medium of claim 15, wherein the instructions, when performed, further enable to processor to:

categorize terms included in the first set of terms; and wherein extracting the term-order data includes determining relationships between the terms based on categories assigned to the terms and a relative order of the terms in the natural language text.

17. The computer readable storage medium of claim 15, wherein the instructions, when performed, further enable to processor to:

in response to receiving user selection of a given historic electronic document of the first set of historic electronic documents, update the machine learning model used to extract the term-order data based on the user selection.

18. The computer readable storage medium of claim 15, wherein the instructions, when performed, further enable to processor to:

rank the first set of historic electronic documents for display on a requesting device based on a relevancy score assigned according to the term-order data.

19. The computer readable storage medium of claim 15, wherein to identify the first set of historic electronic documents that are related to the seed electronic document, the instructions further enable the computer processor to:

cluster the historic electronic documents based on historic term-order data associated with the historic electronic documents;

determine which clusters of the historic electronic documents the seed electronic document belongs to based on the term-order data; and categorize the historic electronic documents that belong to the clusters that the seed electronic document is determined to belong to as match electronic documents to the seed electronic document, wherein match electronic documents are determined to be related to the seed electronic document.

20. The method of claim 1, wherein identifying, from the corpus of historic electronic documents, the first set of historic electronic documents further comprises:

rejecting historic documents from the first set of historic electronic documents that include the first set of terms and have associated term-order data that fall below a relevancy threshold for the term-order data.

* * * * *